United States Patent
Heo et al.

(10) Patent No.: US 8,523,277 B2
(45) Date of Patent: Sep. 3, 2013

(54) SUNROOF MOUNTING DEVICE

(75) Inventors: Seung-Jin Heo, Seoul (KR); Jay-Il Jeong, Seoul (KR); Il-Hwan Kim, Seoul (KR); In-Sik Hwang, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 0 days.

(21) Appl. No.: 13/330,433

(22) Filed: Dec. 19, 2011

(65) Prior Publication Data
US 2012/0153685 A1      Jun. 21, 2012

(30) Foreign Application Priority Data

Dec. 20, 2010 (KR) .................. 10-2010-0130987

(51) Int. Cl.
*B60J 7/02* (2006.01)
(52) U.S. Cl.
USPC .................... 296/216.08; 296/213

(58) Field of Classification Search
USPC ............................. 296/216.08, 213
See application file for complete search history.

(56) References Cited

U.S. PATENT DOCUMENTS

| | | | | |
|---|---|---|---|---|
| 5,090,767 A | * | 2/1992 | Schreiter et al. | 296/216.01 |
| 5,104,178 A | * | 4/1992 | Bienert | 296/216.08 |
| 5,154,482 A | * | 10/1992 | Hayashi et al. | 296/223 |
| 5,540,478 A | * | 7/1996 | Schuch | 296/210 |
| 6,513,865 B1 | * | 2/2003 | Lutz et al. | 296/216.01 |
| 7,922,242 B2 | * | 4/2011 | Comfort et al. | 296/216.08 |

* cited by examiner

*Primary Examiner* — Dennis Pedder
(74) *Attorney, Agent, or Firm* — LRK Patent Law Firm

(57) ABSTRACT

A sunroof mounting device is provided, which includes guide rails of which the entire width is reduced by a pair of first and second guiders arranged up and down such that a moving-connecting portion connected to a sunroof is vertically combined in an open space from a side, such that the space opened by the sunroof is not covered by guide rails and improved open feel.

8 Claims, 6 Drawing Sheets

FIG.6
Prior Art
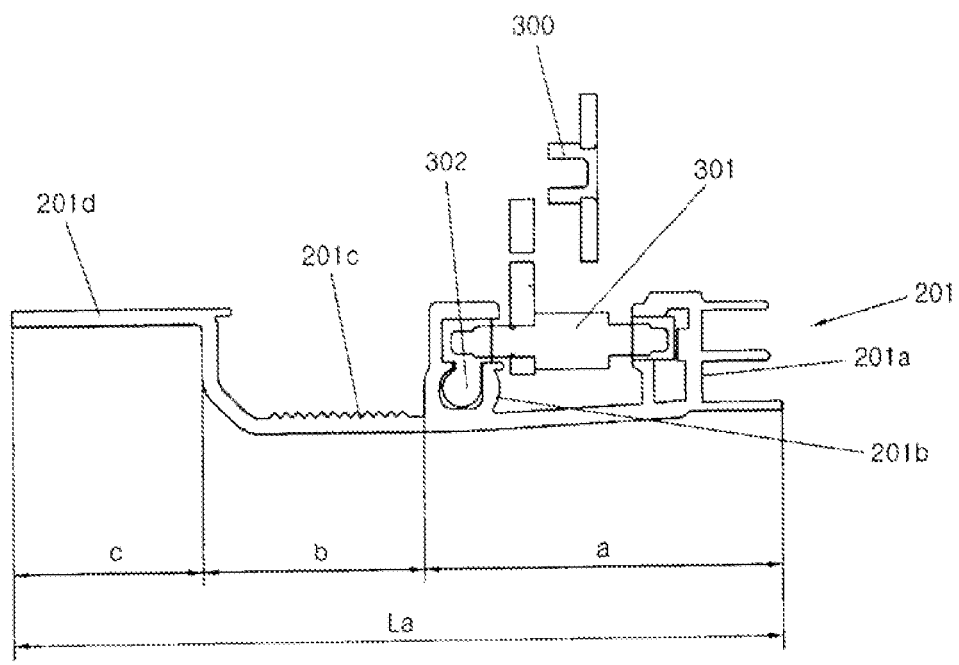
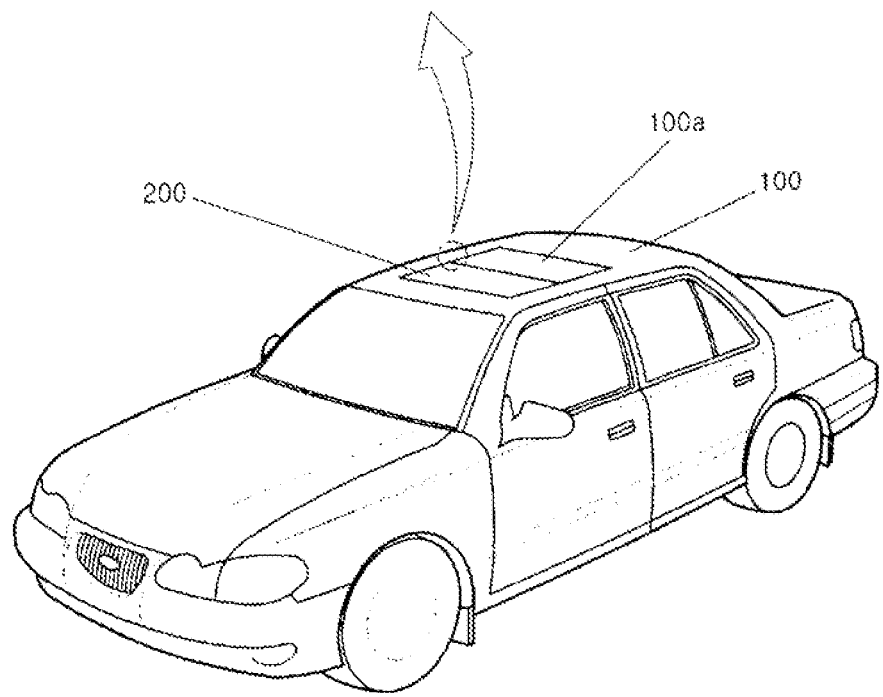

SUNROOF MOUNTING DEVICE

CROSS-REFERENCE TO RELATED APPLICATIONS

The present application claims priority to Korean Patent Application Number 10-2010-0130987 filed Dec. 20, 2010, the entire contents of which application is incorporated herein for all purposes by this reference.

BACKGROUND OF THE INVENTION

1. Field of the Invention

The present invention relates to a sunroof, and particularly, to a sunroof mounting device in which the entire width of a guide rail that guides the sunroof sliding is reduced and the configuration of a connecting portion of the sunroof which is combined with the guide rail is more simplified.

2. Description of Related Art

In general, a sunroof ventilates the indoor of a vehicle or provides open feel which can be provided by a convertible vehicle, by opening a predetermined section of the roof of a vehicle.

The sunroof is implemented in an opening/shutting type that moves up/down the front or rear portion of the sunroof at a predetermined height and a sliding type that is pulled forward or slides backward in a vehicle, in accordance with the operation type for opening/closing.

FIG. 6 shows a sliding type sunroof for opening a predetermined section of the roof of a vehicle.

As shown in the figure, a sunroof space 100a formed by opening a predetermined section is formed through a roof panel 100 in the roof of a vehicle and a sunroof 200 mounted in sunroof space 100a opens a portion of sunroof space 100a while sliding via a motor that is a power source.

The sliding of sunroof 200 is guided 201 by guide rails 201 at left and right sides of sunroof space 100a of roof panel 100.

In general, guide rails 201 each have one side composed of a pair of first and second guiders 201a and 201b each vertically standing to provide a space for combination with a frame portion of sunroof 200 and the other side composed of a fastening-extending surface 201d horizontally extending to be fastened to side fillers forming the left and right sides of roof panel 100, in which a predetermined space is formed by a drain connecting surface 201c between first and second guiders 201a and 201b and fastening-extending surface 201d, thereby blocking foreign substances and discharging water.

First and second guiders 201a and 201b support the left and right portions of a guide rod 301 combined with a frame connecting member 300 connected with the frame of sunroof 200 and second guider 201b in first and second guiders 201 and 201b positions a screw wire 302 combined with guide rod 301.

Screw wire 302 is wound by an electric motor and implements sliding of sunroof 200.

As described above, guide rails 201 requires first and second guiders 201a and 20b, drain connecting surface 201c, and fastening-extending surface 201d, which have a function, respectively, and are sequentially and continuously formed.

Therefore, the entire width La of guide rails 201 depends on guider widths (a) of first and second guiders 201a and 201b, a drain width (b) of drain connecting surface 201c, and a mounting width (c) of fastening-extending surface 201d.

In general, although the larger the open space by sunroof 200, the more the satisfactory increases, the open space that can be increased is necessarily limited in a vehicle with the specification fixed.

When the open area of the sunroof is increased in consideration of only the open feel, drone noise is generated by resonance of the air flow with a low frequency which passes the sunroof and the air in a vehicle and vortex noise is generated by wind noise, which necessarily decreases the commercial quality.

The sliding type of sunroof 200 described above is necessarily open with a portion of sunroof space 100a covered by guide rails 201 that guides the sliding, which is because first and second guiders 201a and 201b of guide rails 201 protrude to sunroof space 100a and guider widths (a) of first and second guiders 201a and 201b have a large ratio in the entire width La of guide rails 201.

Therefore, it is possible to improve the open feel of sunroof space 100a by reducing the ratio occupied by guider widths (a) in the entire width La of guide rails 201, but, basically, there is a limit that guide widths (a) cannot be necessarily reduced to stably mount and slide sunroof 200.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a sunroof mounting device that can achieve satisfactory open feel by reducing the area covered by guide rails with the space opened by a sunroof, by greatly reducing the entire width of the guide rails where a sunroof guiding portion, a drain portion, and a vehicle body-fixed portion are sequentially and continuously formed.

The present invention has been made in an effort to provide a sunroof mounting device that can simplify the sunroof structure by simplifying the configuration of the connecting portion of the sunroof which is combined with the guide rails of which the entire width is largely reduced.

An exemplary embodiment of the present invention provides a sunroof mounting device, including guide rails comprising guiders with vertical open grooves at a gap on one side thereof where a moving-connecting portion connected to a sunroof is fitted; a drain connecting surface extending at the opposite side of the guider for draining; and a fastening-extending surface extending from the drain connecting surface to be fastened to side fillers forming a roof of a vehicle.

The guider, the drain connecting surface, and the fastening-extending surface are connected in parallel and form the entire width of the guide rails.

The guiders are formed vertically to the drain connecting surface.

The guiders include a first guider where a portion of a moving-connecting portion having a screw wire wound by an electric motor is combined and a second guider which guides sliding while preventing deviation of the moving-connecting portion under the first guider and with which another portion of the moving-connecting portion that is combined.

The fastening-extending surface bends at the end of the drain connecting surface and then horizontally extends to be in parallel with the guider or bends.

The moving-connecting portion includes a positioner that is integrally formed with the lower portion of a connecting body connected to the sunroof and guides sliding of the sunroof while preventing deviation of the sunroof when the sunroof slides, and a screw wire integrally formed at one side of the connecting body and wound by an electric motor.

According to the exemplary embodiment of the present invention, the space opened by the sunroof is increased as much as reduction in the entire width of the guide rails that guide sliding of the sunroof, such that more satisfactory open feel is provided, and it is possible to make connecting portion of the sunroof combined with the guide rails in a simpler structure and considerably improve the commercial quality of the sunroof.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 6 is a view showing a common configuration of a sliding type sunroof of the related art.

Figure 1:
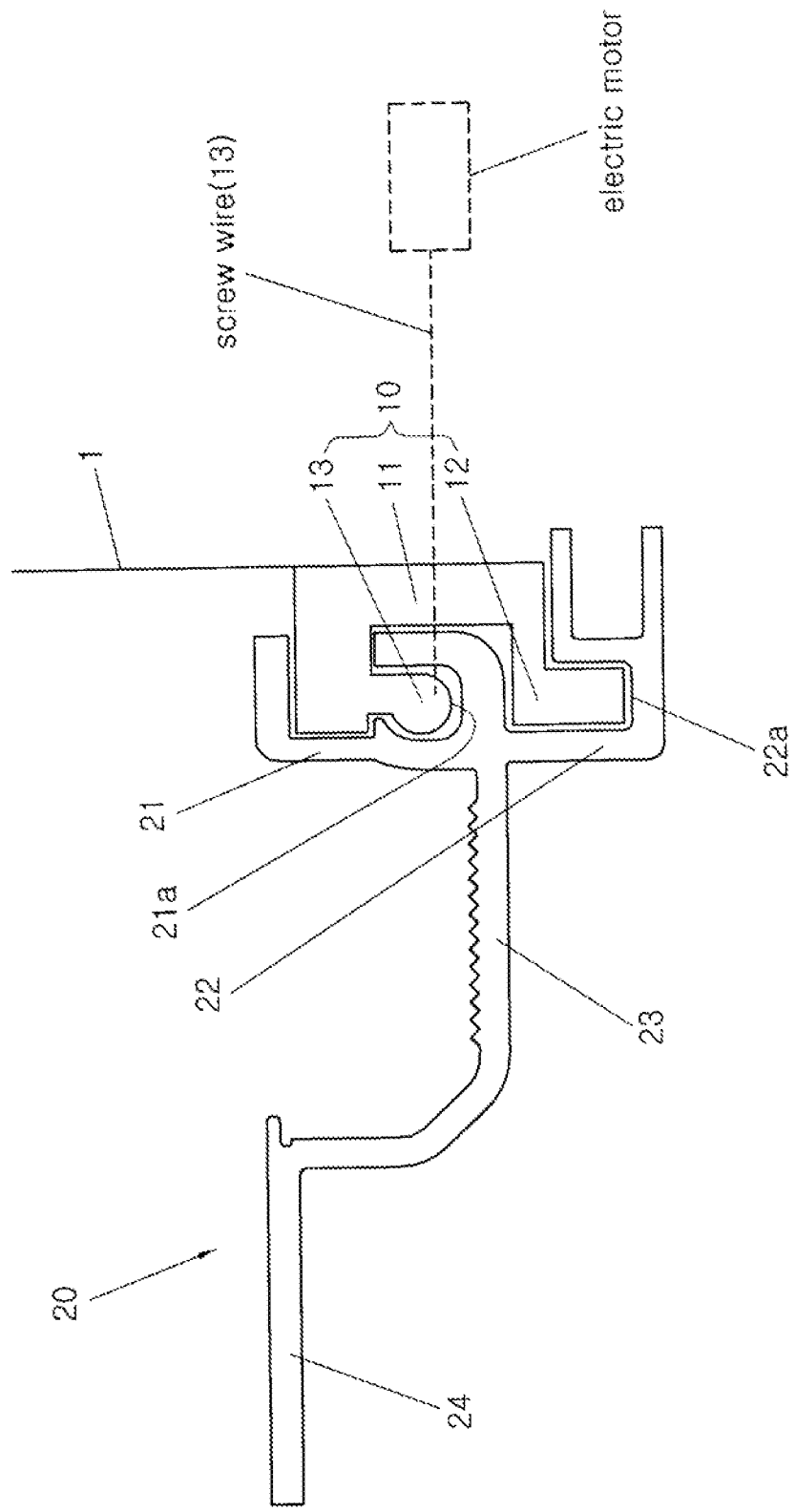
FIG. 1 is a configuration view of a sunroof mounting device according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIG. 1, a sunroof mounting device according to a first exemplary embodiment includes moving-connecting portions 10 coupled to left and right sides of a sunroof 1 to slide sunroof 1 when a motor is operated, and guide rails 20 coupled to left and right sides of an open sunroof space of a roof panel forming a roof of a vehicle and guiding the sliding of moving-connecting portion 10.

Moving-connecting portion 10 is composed of a positioner 12 formed under a connecting body 11 connected to sunroof 1 and a screw wire 13 integrally formed at one side of connecting body 11.

Positioner 12 guides the sliding of sunroof 1 while preventing deviation of sunroof 1 when sunroof 1 slides and screw wire 14 is wound by an electric motor and implements the sliding of sunroof 1.

Guide rail 20 is composed of a guider vertically formed with one side open, a drain connecting surface 23 extending at one side of the guider, and a fastening-extending surface 24 formed by bending the end of drain connecting surface 23.

The guider is composed of a first guider 21 providing a space for disposing screw wire 13 wound by the electric motor and a second guider 22 providing a space for guiding the sliding of sunroof 1 while preventing deviation of sunroof 1.

For this configuration, a position channel 21a that is a groove open at one side is formed at first guider 21 to fit screw wire 13 of moving-connecting portion 10 and a guide channel 22a that is a groove open at one side is formed at second guider 22 to fit positioner 12 of moving-connecting portion 10.

First guider 21 and second guider are formed perpendicular to each other and first guider 21 is positioned above second guider 22.

Drain connecting surface 23 has a drain function such that a predetermined space is formed between the guider and fastening-extending surface 24 and a weather strip for blocking foreign substances is fitted.

Fastening-extending surface 24 extends at a predetermined length to be fastened to side filers forming the left and right sides of the roof panel and the extending portion thereof forms the space of drain connecting surface 23 in parallel with first guider 21.

Figure 2:
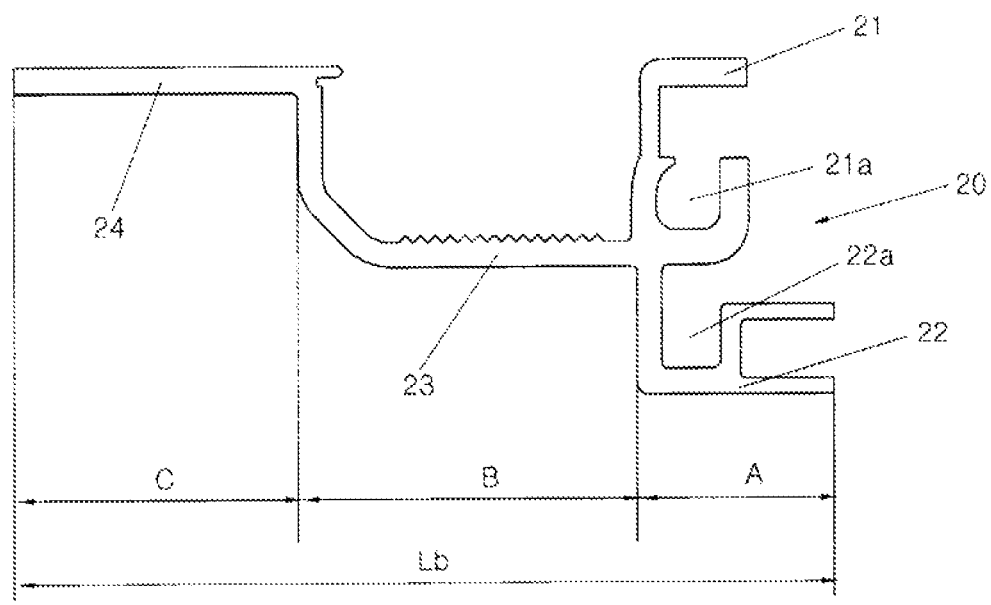
FIG. 2 is a configuration view of a guide rail of which the width is reduced, according to the first exemplary embodiment of the present invention.

As shown in FIG. 2, the entire width Lb of guide rails 20 depends on guider widths A of first and second guiders 21 and 22 perpendicular to each other, a drain width B of a drain connecting surface 23, and a mounting width C of a fastening-extending surface 24.

However, the entire width Lb of guide rails 20 is reduced with reduction of guider width A of first and second guiders 21 and 22 when comparing with the related art.

Figure 3:
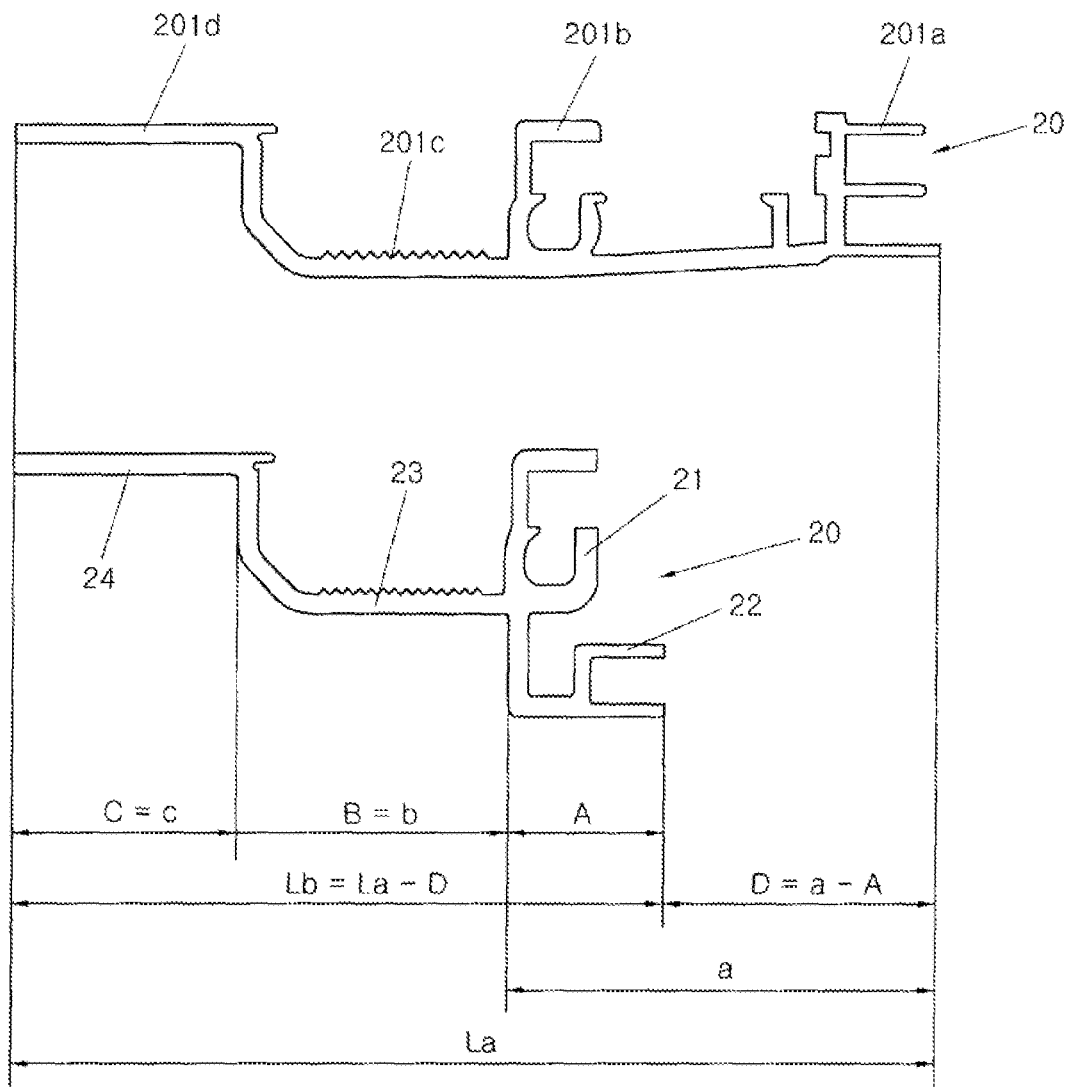
FIG. 3 is a view comparing relative widths of guide rails according to the first exemplary embodiment of the present invention.

FIG. 3 relatively compares the guide rails according to the first exemplary embodiment of the present invention with guide rails of the related art.

As shown in FIG. 3, it can be seen that drain width B of drain connecting surface 23 of guide rail 20 and mounting width C of fastening-extending surface 24 according to the first exemplary embodiment are the same as drain width (b) of drain connecting surface 201c of guide rail 200 and mounting width (c) of fastening-extending surface 201d of the related art.

However, it can be seen that guider width A of first and second guiders 21 and 22 of guide rails 20 according to the first exemplary embodiment is reduced relatively to guider width (a) of first and second guiders 201a and 20b of guide rails 200 of the related art.

That is because first and second guiders 201a and 201b of guide rails 200 of the related art are horizontally formed, while first and second guiders 21 and 22 of guide rails 20 according to the first exemplary embodiment are vertically formed.

The entire width Lb of guide rails 20 according to the first exemplary embodiment also depends on guider width A, drain width B, and mounting width C, similar to guide rails 200 of the related art.

However, the entire width Lb of guide rails 20 according to the first exemplary embodiment is reduced as much as a reduction width D (=a−A) in comparison to the entire width La of guide rails 200 of the related art.

Therefore, it is possible to provide improved open feel in comparison to guide rails 200 of the related art by removing the area covered as much as reduction width D (=a−A) in comparison to guide rails 200 of the related art, even if the space opened by the sunroof is covered by guide rails 20, when guide rails 20 according to the first exemplary embodiment is applied to the sunroof.

Figure 4:
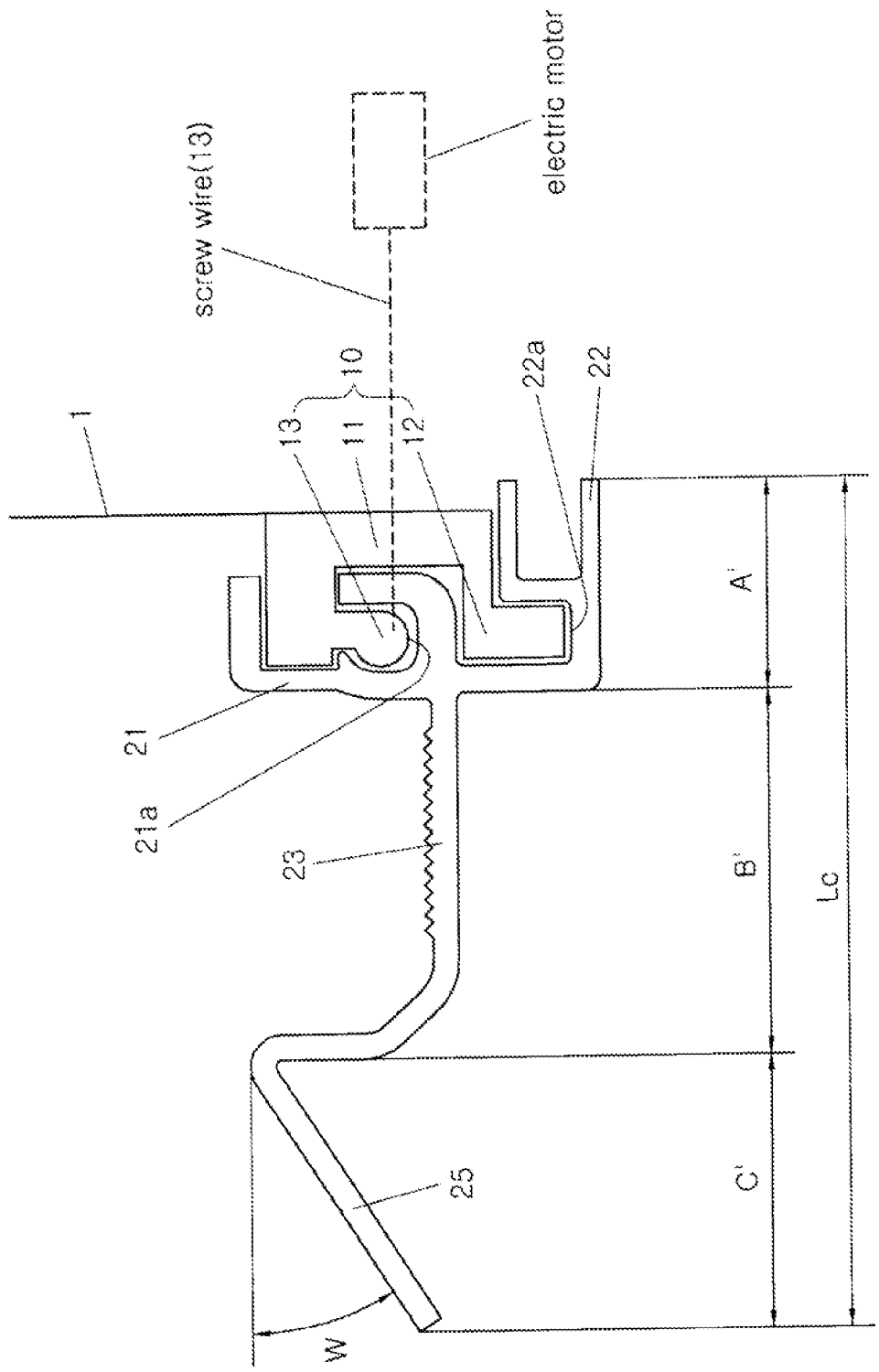
FIG. 4 is a configuration view of a sunroof mounting device equipped with guide rails of which the width is reduced, according to a second exemplary embodiment of the present invention.

Referring to FIG. 4, guide rails 20 according to the second exemplary embodiment of the present invention are the same as those of the first exemplary embodiment, but the entire open width is increased by moving the position of the guide rails according to the first embodiment to the side fillers.

That is, in guide rails 20 according to the second exemplary embodiment, guiders composed of first guider 21 and second guider 22 having the same shapes as the first exemplary embodiment combine with screw wire 13 and positioner 12 of moving-connecting portion 10, and drain connecting surface 23 having the same shape as the first embodiment extends to discharge water at one side of the guider.

However, the left-right open width is increased by making the shape of fastening-extending surface 25 of guide rail 20 according to the second exemplary embodiment different from the shape of fastening-extending surface 24 of the first exemplary embodiment, and fastening the fastening-extending surfaces of the guide rails according to the second exemplary embodiment to the side fillers.

For this configuration, fastening-extending surface 25 of guide rail 20 according to the second exemplary embodiment can be fastened to the side filler by bending again the bent portion of drain connecting surface 23 with an inclination W.

Inclination W of fastening-extending surface is based on the angle of the side fillers, such that the fastening portion is easily formed.

Therefore, the entire width Lc of guide rails 20 according to the second exemplary embodiment also depends on guider widths A' of first and second guiders 21 and 22 perpendicular to each other, a drain width B' of a drain connecting surface 23, and a mounting width C' of a fastening-extending surface 24.

However, the entire open width of the sunroof according to the second exemplary embodiment increases as much as displacement Le of the guide rails to the side fillers.

Figure 5:
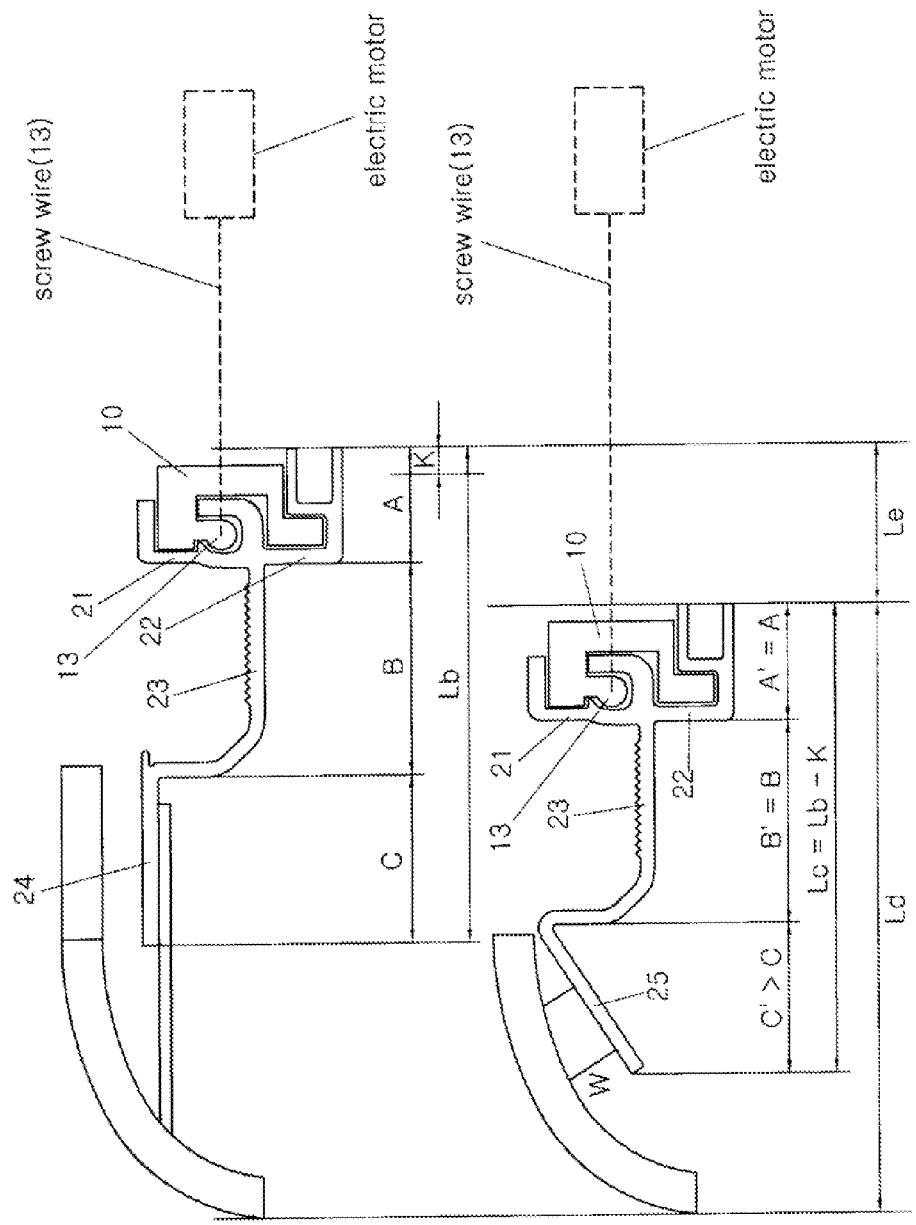
FIG. 5 is a view relatively comparing the guide rail of the second exemplary embodiment of the present invention with those of the first exemplary embodiment.

As shown in FIG. 5, the first exemplary embodiment and the second exemplary embodiment are the same in guider widths A and A' and drain widths B and B' of drain connecting surface 23, but in the second exemplary embodiment, the open width increases as much as displacement Le of the guide rails due to movement of the guide rails.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sunroof mounting device comprising:
 a guide rail having guiders with vertical open grooves at a gap on one side where a moving-connecting portion connected to a sunroof is fitted,
 a drain connecting surface extending at the opposite side of the guider for draining, and
 a fastening-extending surface extending from the drain connecting surface to be fastened to side fillers of a roof of a vehicle,
 wherein the guiders include a first guider which a part of the moving-connecting portion having a screw wire wound by an electric motor is combined with, and a second guider which another part of the moving-connecting portion is combined with and guides sliding while preventing deviation of the moving-connecting portion under the first guider.

2. The sunroof mounting device as defined in claim 1, wherein the guider, the drain connecting surface, and the fastening-extending surface are combined in parallel and form the entire width of the guide rail.

3. The sunroof mounting device as defined in claim 2, wherein the first guider and the second guider are formed vertically to the drain connecting surface.

4. The sunroof mounting device as defined in claim 1, wherein the fastening-extending surface bends at the end of the drain connecting surface and horizontally extends.

5. The sunroof mounting device as defined in claim 4, wherein the fastening-extending surface is in parallel with a top surface of the first guider.

6. The sunroof mounting device as defined in claim 5, wherein the fastening-extending surface is formed with a horizontal straight surface.

7. The sunroof mounting device as defined in claim 1, wherein the fastening-extending surface bends at the end of the drain connecting surface and is fastened to the side fillers with an inclination angle between 0° and 90° from the lower ends of the side fillers.

8. The sunroof mounting device as defined in claim 1, wherein the moving-connecting portion includes a positioner that is integrally formed with the lower portion of a connecting body connected to the sunroof and guides sliding of the sunroof while preventing deviation of the sunroof when the sunroof slides, and a screw wire integrally formed at one side of the connecting body and wound by the electric motor.

* * * * *